(12) United States Patent  
Saito (10) Patent No.: US 8,970,915 B2  
(45) Date of Patent: Mar. 3, 2015

(54) COMMUNICATION DEVICE, FACSIMILE MACHINE, AND NON-TRANSITORY COMPUTER READABLE MEDIUM

(71) Applicant: Fuji Xerox Co., Ltd., Tokyo (JP)

(72) Inventor: Kazutaka Saito, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/912,276

(22) Filed: Jun. 7, 2013

(65) Prior Publication Data

US 2014/0132997 A1    May 15, 2014

(30) Foreign Application Priority Data

Nov. 9, 2012  (JP) ................. 2012-247284

(51) Int. Cl.
*H04N 1/00* (2006.01)
*G06F 15/00* (2006.01)
*G06F 3/12* (2006.01)
*G06K 1/00* (2006.01)
*H04L 29/06* (2006.01)
*H04N 1/327* (2006.01)

(52) U.S. Cl.
CPC ........ *H04L 65/1069* (2013.01); *H04N 1/00209* (2013.01); *H04N 1/3278* (2013.01); *H04N 1/32789* (2013.01); *H04L 65/1006* (2013.01)
USPC ........................................ 358/440; 358/1.15

(58) Field of Classification Search
CPC ............ H04N 1/00209; H04N 1/3278; H04N 1/32789
USPC .................................................. 358/440, 1.15
See application file for complete search history.

(56) References Cited

U.S. PATENT DOCUMENTS 8,254,532 B2 *   8/2012   Wu et al. .................... 379/88.13
2006/0184676 A1 *   8/2006   Tanimoto ...................... 709/227

FOREIGN PATENT DOCUMENTS

JP          2006-100966 A      4/2006

* cited by examiner

*Primary Examiner* — Douglas Tran
(74) *Attorney, Agent, or Firm* — Sughrue Mion, PLLC (57) ABSTRACT

A communication device includes: a first transmitting unit that transmits pattern information specifying a pattern of an offer and an answer in Session Initiation Protocol (SIP) to a called side machine corresponding to a pattern transmitting the offer from the called side machine; a presenting unit that presents called side machine information when the offer transmitted from the called side machine according to the pattern specified in the pattern information and the called side machine information to identify the called side machine are received; and a second transmitting unit that establishes a session with the called side machine by transmitting the answer to the called side machine when a predefined condition is satisfied after the presenting unit presents the called side machine information.

14 Claims, 10 Drawing Sheets

```
INVITE sip:Bob@bbb.com SIP/2.0
Via:SIP/2.0/UDP term1.aaa.com:5060
From:Alice<sip:Alice@aaa.com>;tag=
1234
To:Bob<sip:Bob@bbb.com>;tag=5678
Call-ID:1234@aaa.com
Cseq:1 INVITE
Content-type:application/sdp
Content-Length:100

( Alice's session parameter )
```
} HEADER
} BODY

FIG. 5

```
SIP/2.0 200 OK
Via:SIP/2.0/UDP term1.aaa.com:5060
From:Alice<sip:Alice@aaa.com>;tag=
1234
To:Bob<sip:Bob@bbb.com>;tag=5678
Call-ID:1234@aaa.com
Cseq:1 INVITE
Content-type:application/sdp
Content-Length:100

( Bob's session parameter )
```
} HEADER
} BODY

COMMUNICATION DEVICE, FACSIMILE MACHINE, AND NON-TRANSITORY COMPUTER READABLE MEDIUM

CROSS-REFERENCE TO RELATED APPLICATIONS

This application is based on and claims priority under 35 U.S.C. 119 from Japanese Patent Application No. 2012-247284 filed on Nov. 9, 2012.

BACKGROUND

Technical Field

The present invention relates to a communication device, a facsimile machine, and a non-transitory computer readable medium.

SUMMARY

According to an aspect of the invention, a communication device includes: a first transmitting unit that transmits pattern information specifying a pattern of an offer and an answer in Session Initiation Protocol (SIP) to a called side machine corresponding to a pattern transmitting the offer from the called side machine; a presenting unit that presents called side machine information when the offer transmitted from the called side machine according to the pattern specified in the pattern information and the called side machine information to identify the called side machine are received; and a second transmitting unit that establishes a session with the called side machine by transmitting the answer to the called side machine when a predefined condition is satisfied after the presenting unit presents the called side machine information.

BRIEF DESCRIPTION OF THE DRAWINGS

Exemplary embodiment(s) of the present invention will be described in detail based on the following figures, wherein.

DETAILED DESCRIPTION

<Basic Configuration of Exemplary Embodiment>

Figure 1:
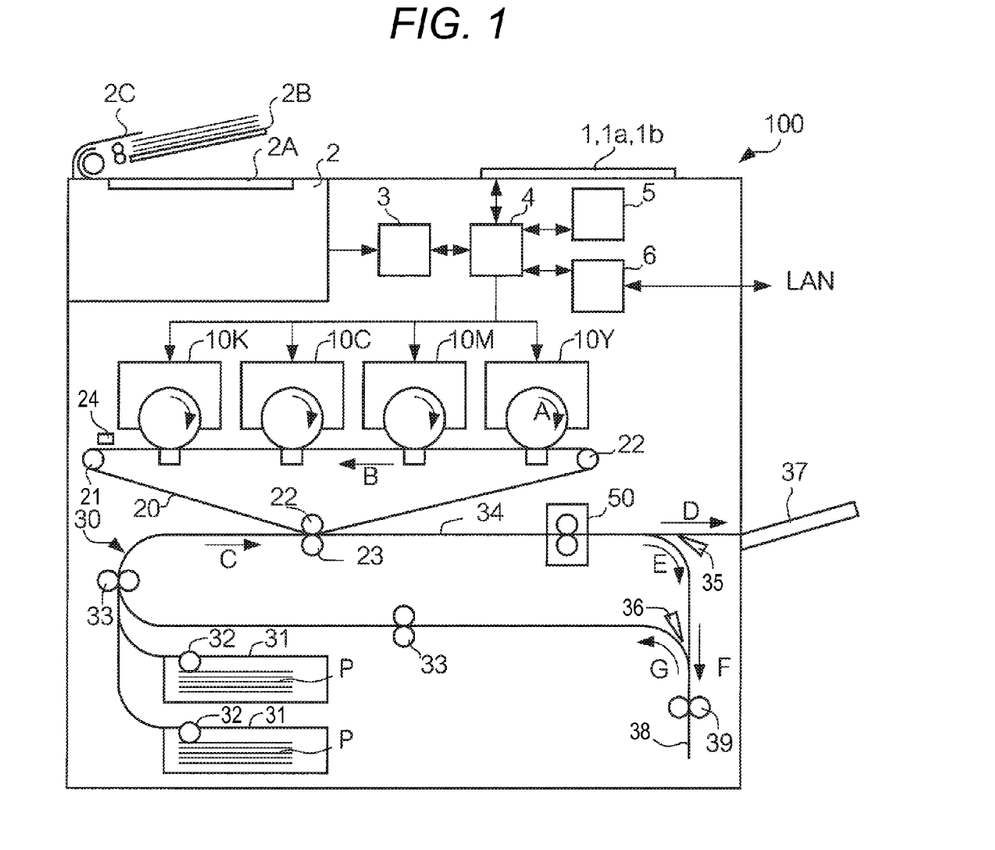
FIG. 1 is a view illustrating a hardware configuration of a facsimile machine 100.

FIG. 1 is a view illustrating a hardware configuration of a facsimile machine 100.

A controller 4 includes a central processing unit (CPU) (not illustrated) serving as an arithmetic device, and a read only memory (ROM) and a random access memory (RAM) (both not illustrated) serving as memory devices. The ROM stores firmware describing a start-up sequence of hardware or operating system (OS). The RAM is used to store data produced when the CPU executes an arithmetic operation.

An operating unit 1 includes a display part 1a having a touch panel function and a group of pushing button type operators 1b, receives an operation performed by a user and outputs a signal indicating the content of the operation to the controller 4.

A storing unit 5 such as a hard disk memory device stores an operating system (OS), a communication control programs for controlling communication with other facsimile machines, and the like. The controller 4 controls various components of the facsimile machine 100 by executing the OS and the communication control program.

A communication unit 6 serving as a communication interface (I/F) is connected to a communication line (not illustrated) such as a local area network (LAN) or the like and intermediates communication between the facsimile machine 100 and other devices.

A reading unit 2 reads a manuscript optically to generate image data. Specifically, the reading unit 2 includes a light source, an optical system and an imaging device (not illustrated at all) and the manuscript placed on platen glass 2A is irradiated with light from the light source. The light reflected from the manuscript is decomposed into red color (R), green color (G) and blue color (B) through the optical system, which are then incident into the imaging device. The imaging device converts the incident light into image data which are then supplied into an image processing unit 3. The reading unit 2 further includes a manuscript table 2B on which manuscripts are placed, and a manuscript carrying mechanism 2C for carrying the manuscripts onto the platen glass 2A one by one.

The image processing unit 3 performs an image process for the image data. Specifically, the image processing unit 3 converts the image data supplied from the reading unit 2 from an analog form into a digital form which is then subjected to noise removal, gamma correction, conversion of RGB (Red, Green and Blue) into YMCK (Yellow, Magenta, Cyan and Black), screening, and the like. In addition, the image processing unit 3 performs the same image process for image data received externally by the communication unit 6. If the externally received image data include vector data, the image processing unit 3 converts the vector data into raster data (rasterizing). Thus, raster data indicating different pixel gray scales are produced for different colors.

Image forming units 10Y, 10M, 10C and 10K form toner images of Y, M, C and K colors on a surface of an intermediate transfer body 20 by means of electrophotography, respectively, based on the raster data supplied from the image processing unit 3. The image forming units 10Y, 10M, 10C and 10K have the same configuration and are collectively termed an "image forming unit 10" if they are not required to be distinguished from each other.

A carrying unit 30 carries recording media P along a carrying path 34. Specifically, sheet-like recording media P such as paper and the like are piled in a media accommodating part 31 and a feeding roller 32 feeds the recording media P onto the carrying path 34 one by one. The recording media P are carried in a direction indicated by an arrow C along the carrying path 34 by means of a carrying roller 33. The toner images on the intermediate transfer body 20 are transferred onto the recording media P by means of a transfer roller 23.

The facsimile function of the facsimile machine 100 is based on ITU-T (International Telecommunication Union Telecommunication Standardization Sector) T.38.

Figure 2:
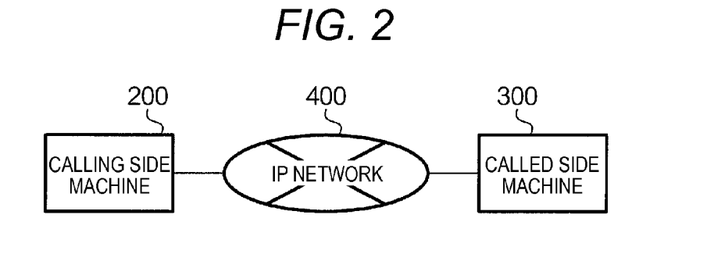
FIG. 2 is a view illustrating a communication system for implementing a facsimile functionality.

FIG. 2 is a view illustrating a communication system for implementing a facsimile functionality. Here, for the convenience, two facsimile machines 100 having the same configuration are distinctly divided into a calling side machine 200 and a called side machine 300. The calling side machine 200 corresponds to a facsimile machine transmitting an image. The called side machine 300 corresponds to a facsimile machine receiving an image.

The calling side machine 200 and the called side machine 300 are connected to an IP (Internet Protocol) network 400. When the facsimile function is used to transmit an image, a user places a manuscript on the manuscript table 2B of the calling side machine 200 and uses the operating unit 1 to instruct transmission of the image by the facsimile function. Then, the reading unit 2 reads the manuscript and the image processing unit 3 generates raster data. The communication unit 6 establishes a session with the called side machine 300 by SIP (Session Initiation Protocol), converts the raster data into a packet which is then transmitted to the called side machine 300 via the IP network 400.

The SIP is a calling control protocol standardized by RFC (Request for Comments) 3261 or the like.

Figure 3:
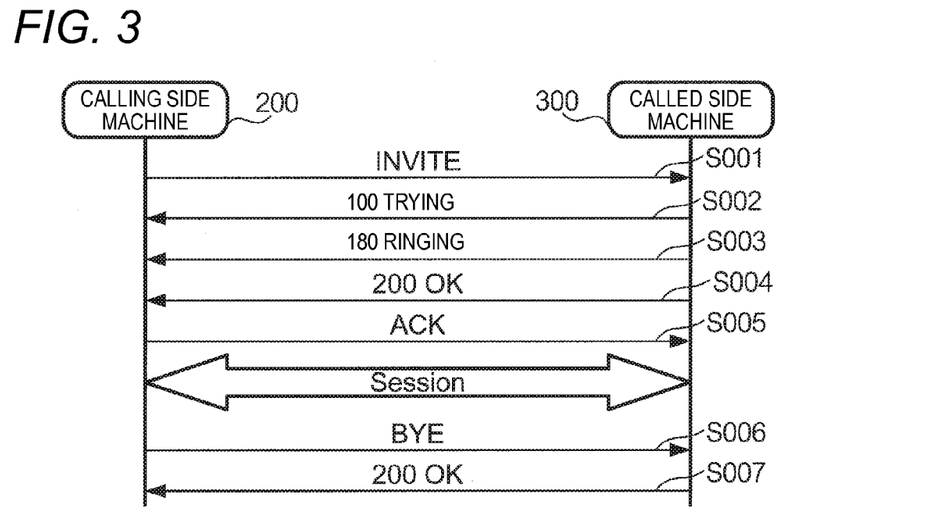
FIG. 3 is a view illustrating a base sequence of SIP.

FIG. 3 is a view illustrating a base sequence of the SIP.

At Step S001, the calling side machine 200 transmits an INVITE message to the called side machine 300.

Figure 4:
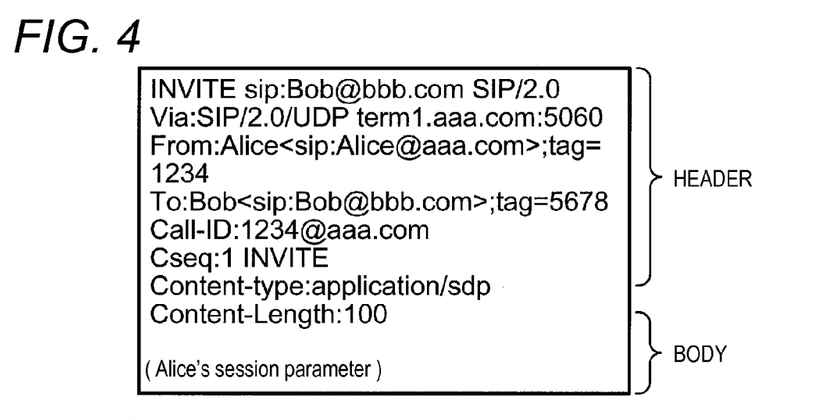
FIG. 4 is a view illustrating an example of a request message of SIP.

FIG. 4 is a view illustrating an example of a request message of SIP. A SIP message has a header and a body.

A leading line of the header is described with a method name (INVITE in this example), SIP URI (Uniform Resource Identifier) corresponding to a communication address of the called side machine 300, and a type of calling control protocol (SIP/2.0 in this example). The INVITE method is a method requesting a session establishment.

A Via header represents a routing path. A From header represents a transmitter. A To header represents a receiver. A Call-ID header is an ID for identifying a session and the same Call-ID is assigned the same session. A Cseq header is a sequence number for each session. A content-type header represents a data format of the body. A Content-length header represents the amount of data of the body.

The body starts from the next line to the blank line. A parameter related to this session (hereinafter referred to as a "session parameter") is described to comply with SDP (Session Description Protocol, RFC4566). The session parameter may include a type of media used for this session, a coding scheme, an IP address and so on. The session establishment requires exchange of the session parameter between the calling side machine 200 and the called side parameter 300 based on an offer-answer model defined by RFC3264. For the exchange of the session parameter, one of the calling side machine 200 and the called side machine 300 transmits an offer including a session parameter of the one machine and the other machine transmits an answer including a session parameter of the other machine in response to this offer. The example of FIG. 4 is an example of transmission of an offer by the calling side machine 200, in which the session parameter of the calling side machine 200 is described.

Next, at Step S002, the called side machine 300 transmits a 100 Trying message to the calling side machine 200. The 100 Trying refers to a potential response representing a trial.

At Step S003, the called side machine 300 transmits a 180 Ringing message to the calling side machine 200 for a predetermined period of time. The 180 Ringing refers to a potential response representing a calling.

At Step S004, the called side machine 300 transmits a 200 OK message to the calling side machine 200. The 200 OK refers to a response representing a successful request (INVITE in this example).

Figure 5:
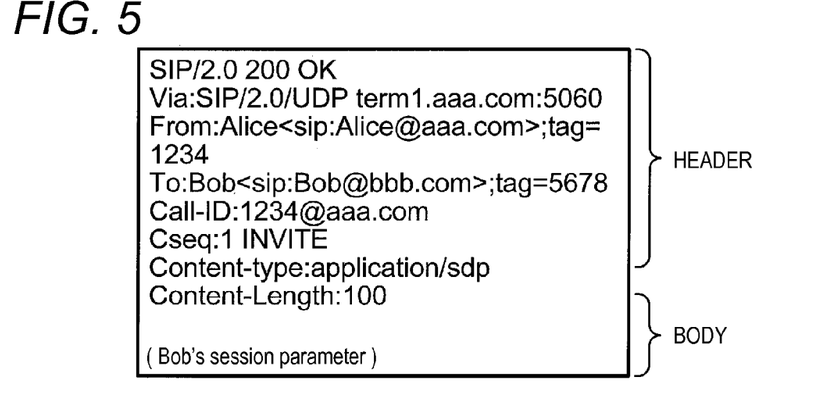
FIG. 5 is a view illustrating an example of a response message of SIP.

FIG. 5 is a view illustrating an example of a response message of SIP. This example shows an answer to the offer illustrated in FIG. 4, in which the session parameter of the called side machine 300 is described.

At Step S005, the calling side machine 200 transmits an ACK message to the called side machine 300. When the ACK is received in the called side machine 300, a session is established and the calling side machine 200 transmits data to the called side machine 300.

When the transmission of data is completed, at Step S006, the calling side machine 200 transmits a BYE message to the called side machine 300. The BYE refers to a request representing a session ending. When this message is received in the called side machine 300, the session is ended.

At Step S007, the called side machine 300 transmits a 200 OK message to the calling side machine 200. The 200 OK refers to a response representing a successful session ending.

Figure 6:
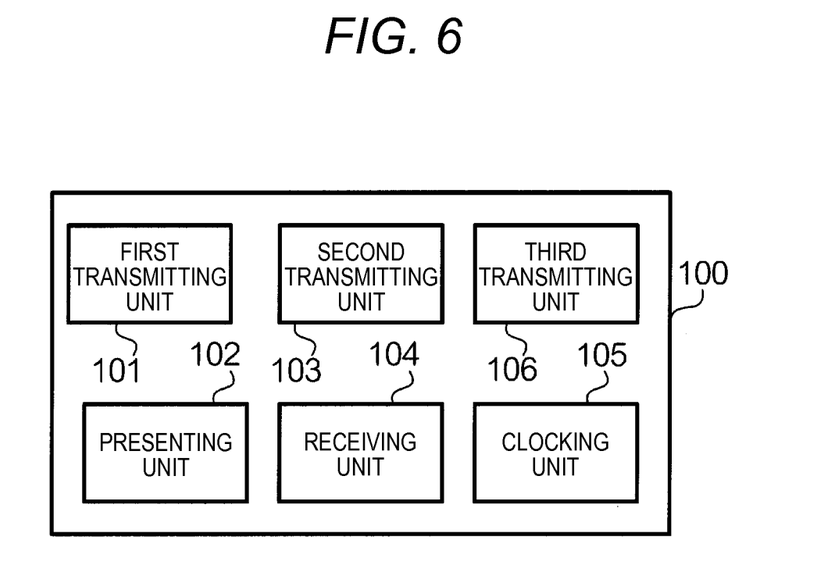
FIG. 6 is a view illustrating a functional configuration of a facsimile machine 100.

FIG. 6 is a view illustrating a functional configuration of the facsimile machine 100.

A first transmitting unit 101, a presenting unit 102, a second transmitting unit 103, a receiving unit 104 and a clocking unit 105 constitute a function as the calling side machine 200. A third transmitting unit 106 constitutes a function as the called side machine 300. These functions are implemented by the controller 4 operating the communication unit and so on according to the communication control program stored in the storing unit 5.

Specifically, when a user places a manuscript on the manuscript table 2B of the calling side machine 200 and uses the operating unit 1 to instruct transmission of the image by the facsimile function, the reading unit 2 reads the manuscript and the image processing unit 3 generates raster data. Subsequently, the controller 4 performs a process for session establishment with the called side machine 300 by means of the following functions.

For the calling side machine 200, the first transmitting unit 101 transmits pattern information corresponding specifying a pattern of an offer and an answer in the SIP to a pattern transmitting the offer from the called side machine 300 to the called side machine 300. As described previously, in the SIP, the session parameters of both machines 200 and 300 are exchanged by the offer and the answer. A sequence of this exchange refers to an offer-answer pattern (OAP). An identifier for identifying the OAP is the exact pattern information.

For the called side machine 300, upon receiving the pattern information specifying a pattern of an offer and an answer in the SIP, corresponding to a pattern transmitting the offer from the called side machine 300, the third transmitting unit 106 transmits the offer including called side machine information for identifying the machine to the calling side machine 200, according to the corresponding pattern. Specifically, the communication control program stored in the storing unit 5 is described with OAPs corresponding to a variety of pattern information and the controller 4 performs a process for session establishment according to an OAP corresponding to received pattern information. The called side machine information refers to information for allowing a user of the calling side machine 300 to identify the called side machine 300 and may include, for example, a name of a user using the called side machine 300, a name of a business place or a department in which the called side machine 300 is installed, and the like.

For the calling side machine 200, upon receiving the offer transmitted from the called side machine 300 according to the pattern specified in the pattern information, and the called side machine information for identifying the called side machine 300, the presenting unit 102 presents this called side machine information. Specifically, the controller 4 displays the received called side machine information on the display part 1*a* of the operating unit 1.

Figure 7:
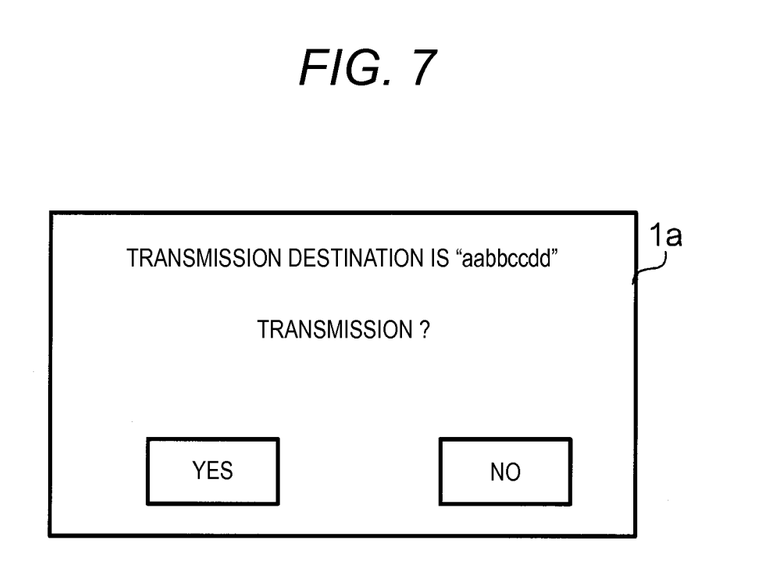
FIG. 7 is a view illustrating displayed called side machine information.

FIG. 7 is a view illustrating the displayed called side machine information. The display part 1*a* is displayed with a description to inquire of a user whether or not an image is transmitted to a destination corresponding to the called side machine information, and a button to instruct necessity or unnecessity of transmission. In addition, it may be favorable to output a speech indicating the called side machine information.

If a predefined condition is satisfied after the presenting unit 102 presents the called side machine information, the second transmitting unit 103 establishes a session with the called side machine 300 by transmitting an answer to the called side machine 300.

Specifically, when a predefined operation is received by the receiving unit 104 after the presenting unit 102 presents the called side machine information, the second transmitting unit 103 transmits the answer to the called side machine 300. The receiving unit 104 corresponds to the above-mentioned operating unit 1. The predefined operation refers to an operation for a user to touch a "YES" button on a screen illustrated in FIG. 7.

The clocking unit 105 counts an elapsed time after the presenting unit 102 presents the called side machine information. If the elapsed time reaches a threshold value, the second transmitting unit 103 transmits a machine parameter related to this session to the called side machine 300. Specifically, the clocking unit 105 counts the elapsed time as the controller 4 counts a clock signal. If a user touches the "YES" button before the elapsed time reaches the threshold value or if the elapsed time reaches the threshold value without touching the "YES" button by the user, the controller 4 transmits the machine session parameter to the called side machine 300.

First Exemplary Embodiment

Figure 8:
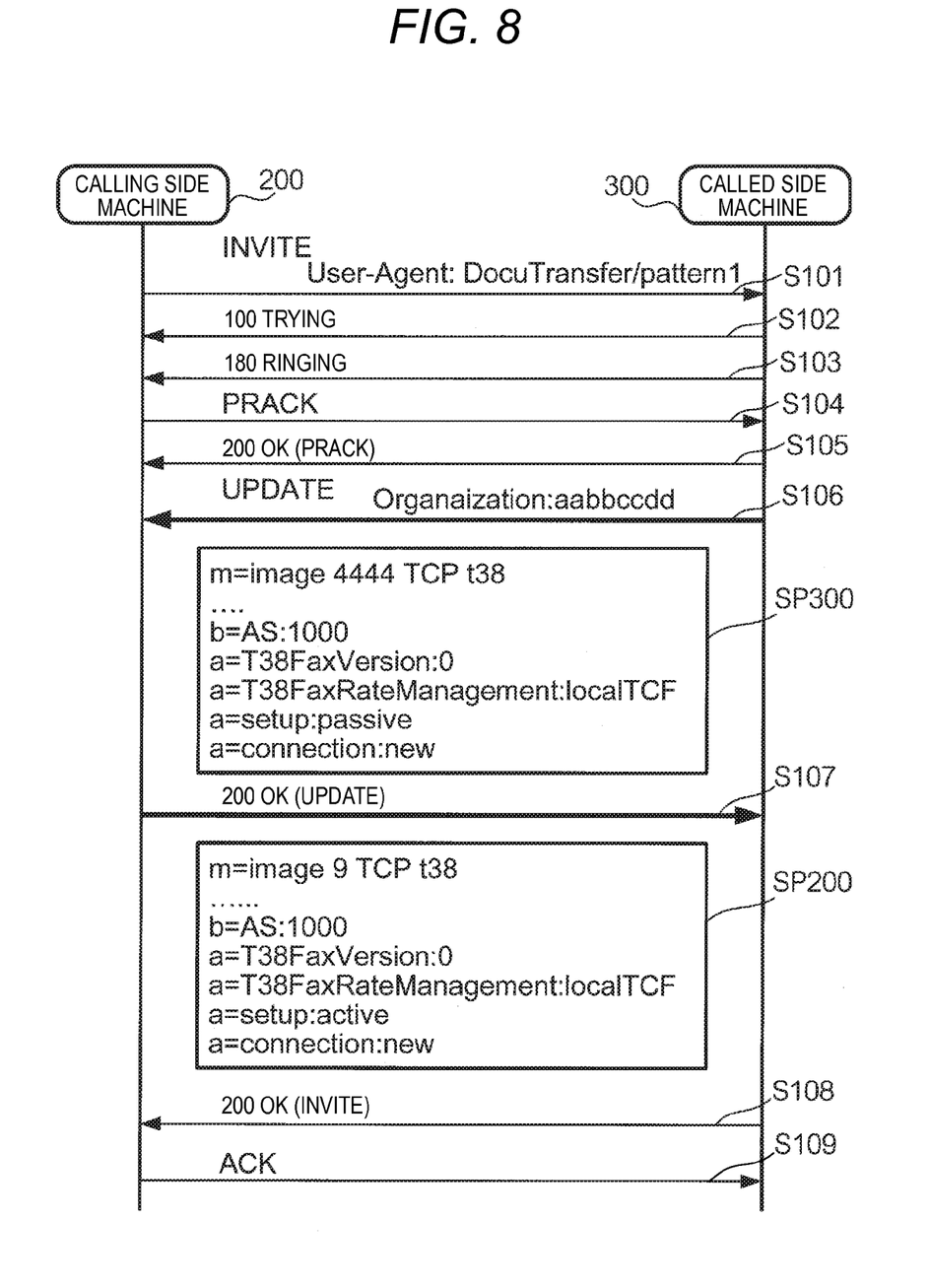
FIG. 8 is a view illustrating a sequence of a first exemplary embodiment.

FIG. 8 is a view illustrating a sequence of a first exemplary embodiment.

At Step S101, the calling side machine 200 transmits an INVITE message including pattern information to the called side machine 300 according to the function as the first transmitting unit 101. In this example, the pattern information is described as a User-Agent header and OAP is Pattern 1. In addition, the INVITE message may or not include a session parameter.

At Step S102, the called side machine 300 transmits a 100 Trying message (in trial) to the calling side machine 200.

At Step S103, the called side machine 300 transmits a 180 Ringing message (in call) to the calling side machine 200.

At Step S104, the calling side machine 200 transmits a PRACK message (ACK for a potential response) to the called side machine 300.

At Step S105, the called side machine 300 transmits a 200 OK message (a successful response to PRACK) to the calling side machine 200.

At Step S106, the called side machine 300 transmits an UPDATE message to the calling side machine 200 according to the function as the third transmitting unit 106. The UPDATE is a method to update a session parameter and is described with a session parameter SP300 of the called side machine 300. That is, this UPDATE message is an offer for the calling side machine 200. In addition, a called side organization name is described as called side machine information by an Organization header.

Upon receiving the UPDATE message, the calling side machine 200 presents the called side machine information according to the function as the presenting unit 102 and then proceeds to Step S107 if a user touches the "YES" button before elapsed time reaches a threshold value or if the elapsed time reaches the threshold value without touching the "YES" button by the user.

At Step S107, the calling side machine 200 transmits a 200 OK message (a successful response to UPDATE) to the called side machine 300 according to the function as the second transmitting unit 103. This message is described with a session parameter SP200 of the calling side machine 200. That is, this 200 OK message is an answer for the called side machine 300.

At Step S108, the called side machine 300 transmits a 200 OK message (a successful response to INVITE) to the calling side machine 200.

At Step S109, the calling side machine 200 transmits ACK to the called side machine 300. This allows a session between the calling side machine 200 and the called side machine 300 to be established and allows image data to be transmitted from the calling side machine 200 to the called side machine 300. (The rest is omitted)

In fixed telephone circuit-based facsimile communications using no IP network, since time required from calling to session establishment is several seconds and it takes several seconds to transmit image data corresponding to one page, there is enough time to suspend transmission when a user is aware of a wrong destination after calling. In contrast, in IP network-based facsimile communications, when a session is established in SIP, since both of time required to establish the session (from Step S001 (INVITE) to Step S005 (ACK) in FIG. 3) and time required to transmit the image date are even shorter than those in the fixed telephone circuit-based facsimile communications, there is, in effect, no enough time to suspend transmission even when a user is aware of a wrong destination after calling.

In this exemplary embodiment, since the calling side machine 200 is configured to transmit an answer to the called side machine 300 when the calling side machine 200 receives an offer including the called side machine information after calling (INVITE) and a user touches the "YES" button before the elapsed time reaches the threshold value after presenting the called side machine information or the elapsed time reaches the threshold value without touching the "YES" button by the user, enough time for the user to confirm the called side machine information from the calling to the session establishment can be provided. In addition, since the called side information is transmitted from the called side machine, this information has high reliability of determining whether or not a destination is correct.

In addition, there may be methods to acquire the called side machine information using a MESSAGE method or an OPTIONS method. However, since these methods are to be used before calling, the called side machine might already have been in a Busy state (a state where the called side machine have established a session with another machine) even when a user has made a call after confirming the called side machine information using these methods. On the contrary, in this exemplary embodiment, since the called side machine information is acquired after making a call, the called side machine will not be in a Busy state after the acquisition of the called side machine information.

In addition, since the OPTIONS method is inacceptable for public IP networks, it cannot be used for external line-based facsimile communications. However, in this exemplary embodiment, since a method acceptable for the public IP networks can be used, the called side machine information can be acquired even via an external line.

Second Exemplary Embodiment

A second exemplary embodiment will be described with an emphasis placed on differences from the first exemplary embodiment.

For the calling side machine 200, the first transmitting unit 101 transmits calling side machine information for identifying the machine, in addition to pattern information, to the called side machine 300.

For the called side machine 300, the third transmitting unit 106 receives the pattern information via an external line. In addition, if the third transmitting unit 106 does not receive the calling side machine information for identifying the calling side machine 200, it transmits an offer, which does not include the calling side machine information and a memory address of the calling side machine information, to the calling side machine 200.

In addition, for the called side machine 300, if the third transmitting unit 106 receives the pattern information via an internal line, it transmits the offer to the calling side machine 200 irrespective of whether or not it receives the calling side machine information for identifying the calling side machine 200.

Figure 9:
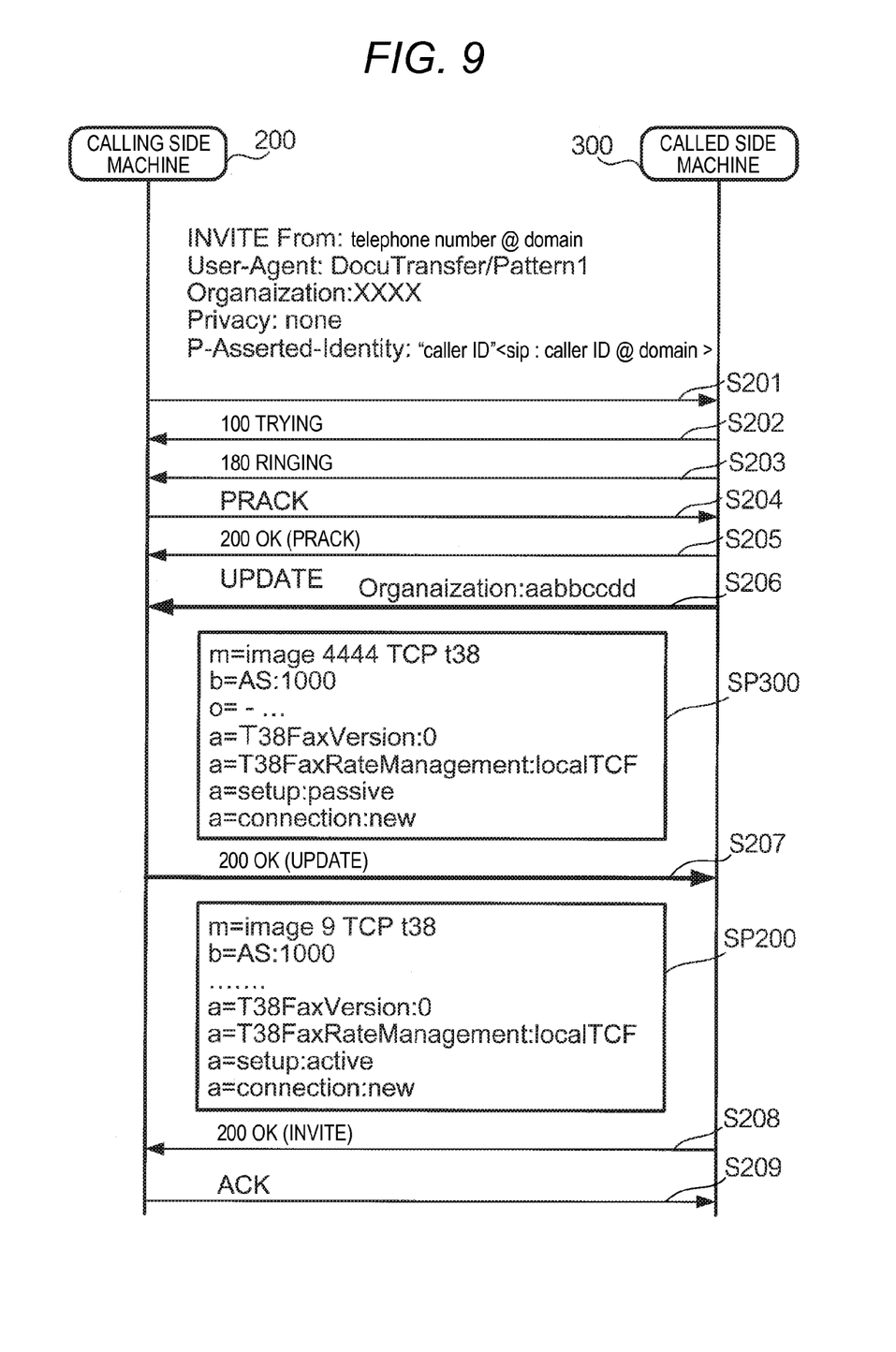
FIG. 9 is a view illustrating a sequence of a second exemplary embodiment.

FIG. 9 is a view illustrating a sequence of the second exemplary embodiment.

At Step S201, the calling side machine 200 transmits an INVITE message including the pattern information and the calling side machine information to the called side machine 300 according to the function as the first transmitting unit 101. A domain name is included in the calling side machine information described as a From header. In addition, as the calling side machine information, an organization name is described by an Organization header or a caller ID is described by a P-Asserted-Identity header. The pattern information is Pattern 1. That is, OAP is equal to that in the first exemplary embodiment.

At Step S202, the called side machine 300 transmits a 100 Trying message (in trial) to the calling side machine 200.

At Step S203, the called side machine 300 transmits a 180 Ringing message (in call) to the calling side machine 200.

At Step S204, the calling side machine 200 transmits a PRACK message (ACK for a potential response) to the called side machine 300.

At Step S205, the called side machine 300 transmits a 200 OK message (a successful response to PRACK) to the calling side machine 200.

At Step S206, the called side machine 300 transmits an UPDATE message (offer) to the calling side machine 200 according to the function as the third transmitting unit 106. Here, the called side machine 300 determines whether this message is received via the external line or the internal line, based on the domain name described in a line of the Form header. For the internal line, the called side machine 300 transmits the update message including the called side machine information to the calling side machine 200 irrespective of whether or not the called side machine 300 receives the calling side machine information. Otherwise, for the external line, the called side machine 300 determines whether or not the calling side machine information is included in the INVITE message. If it is determined that the calling side machine information is included, the called side machine 300 transmits the UPDATE message including the called side machine information to the calling side machine 200. Otherwise, if it is determined that the calling side machine information is not included in the INVITE message, the called side machine 300 transmits the UPDATE message including no called side machine information to the calling side machine 200.

A sequence after the calling side machine 200 receives the UPDATE message including the called side machine information is equal to that in the first exemplary embodiment. On the other hand, if the calling side machine 200 receives the UPDATE message including no called side machine information, no called side machine information is presented.

Third Exemplary Embodiment

A third exemplary embodiment will be described with an emphasis placed on differences from the first exemplary embodiment.

Figure 10:
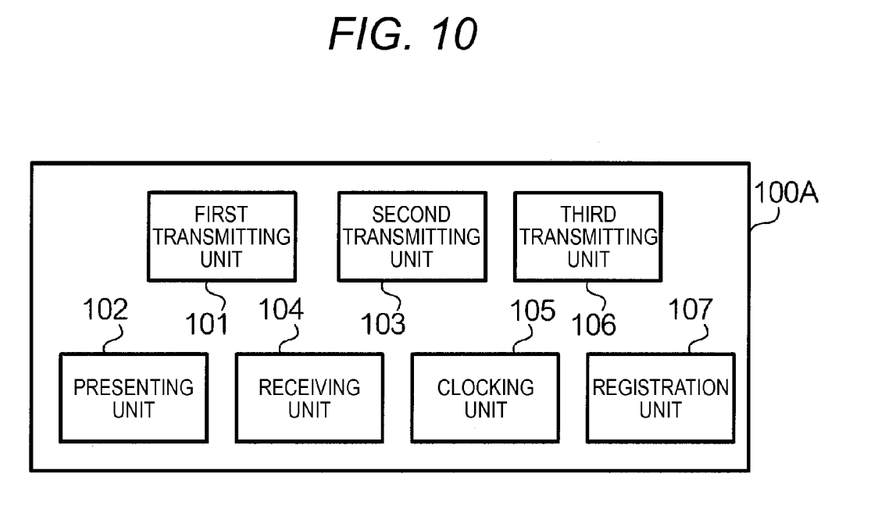
FIG. 10 is a view illustrating a functional configuration of a facsimile machine 100A.

FIG. 10 is a view illustrating a functional configuration of a facsimile machine 100A. This facsimile machine has a registration unit 107 in addition to the functional configuration of the first exemplary embodiment.

For the calling side machine 200, the registration unit 107 registers called side machine information. The first transmitting unit 101 transmits an offer to the called side machine 300 corresponding to the called side machine information registered with the registration unit 107 without transmitting pattern information. Specifically, an address book is stored in the storing unit 5. For example, upon receiving the called side machine information from the called side machine 300 by the UPDATE message in Step S106 of the first exemplary embodiment (see FIG. 8), the controller 4 of the calling side machine 200 inquires of a user whether to register the called side machine information when a user touches one of "YES" and "NO" buttons on the screen illustrated in FIG. 7.

Figure 11:
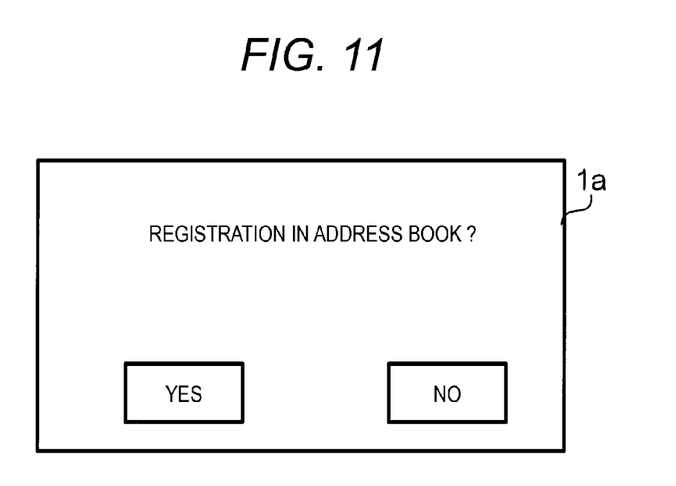
FIG. 11 is a view illustrating an inquiry screen.

FIG. 11 is a view illustrating an inquiry screen. When a user touches a "YES" button, the controller 4 records the called side machine information in an address book.

When a new session is established, if the user instructs transmission of an image to a destination, i.e., the called side machine 300 corresponding to the called side machine information registered in the address book, the controller 4 transmits an INVITE message including a session parameter without including pattern information to the called side machine 300. In this case, the session establishment is performed according to the basis sequence illustrated in FIG. 3. That is, transmission of the called side machine information to the calling side machine 200 will not be performed.

Fourth Exemplary Embodiment

A fourth exemplary embodiment will be described with an emphasis placed on differences from the third exemplary embodiment.

For the calling side machine 200, when the received called side machine information has been registered in the registration unit 107, the presenting unit 102 does not present the called side machine information and the second transmitting unit 103 receives the called side machine information, followed by transmitting an answer to the called side machine 300. Specifically, upon receiving the called side machine information from the called side machine 300 by the UPDATE message in Step S106 of the first exemplary embodiment (see FIG. 8), the controller 4 of the calling side machine 200 determines whether or not the called side machine information has been registered in the address book and, if so, transmits an answer to the called side machine 300 without presenting the called side machine information.

Modified Embodiments

The above-described exemplary embodiments may be modified like modified embodiments illustrated below. In addition, the exemplary embodiments and the modified embodiments may be used in combination. In addition, some or all of these modified embodiments may be used in combination.

Modified Embodiment 1

The calling side machine 200 may acquire the called side machine information from an external device other than the called side machine 300.

Figure 12:
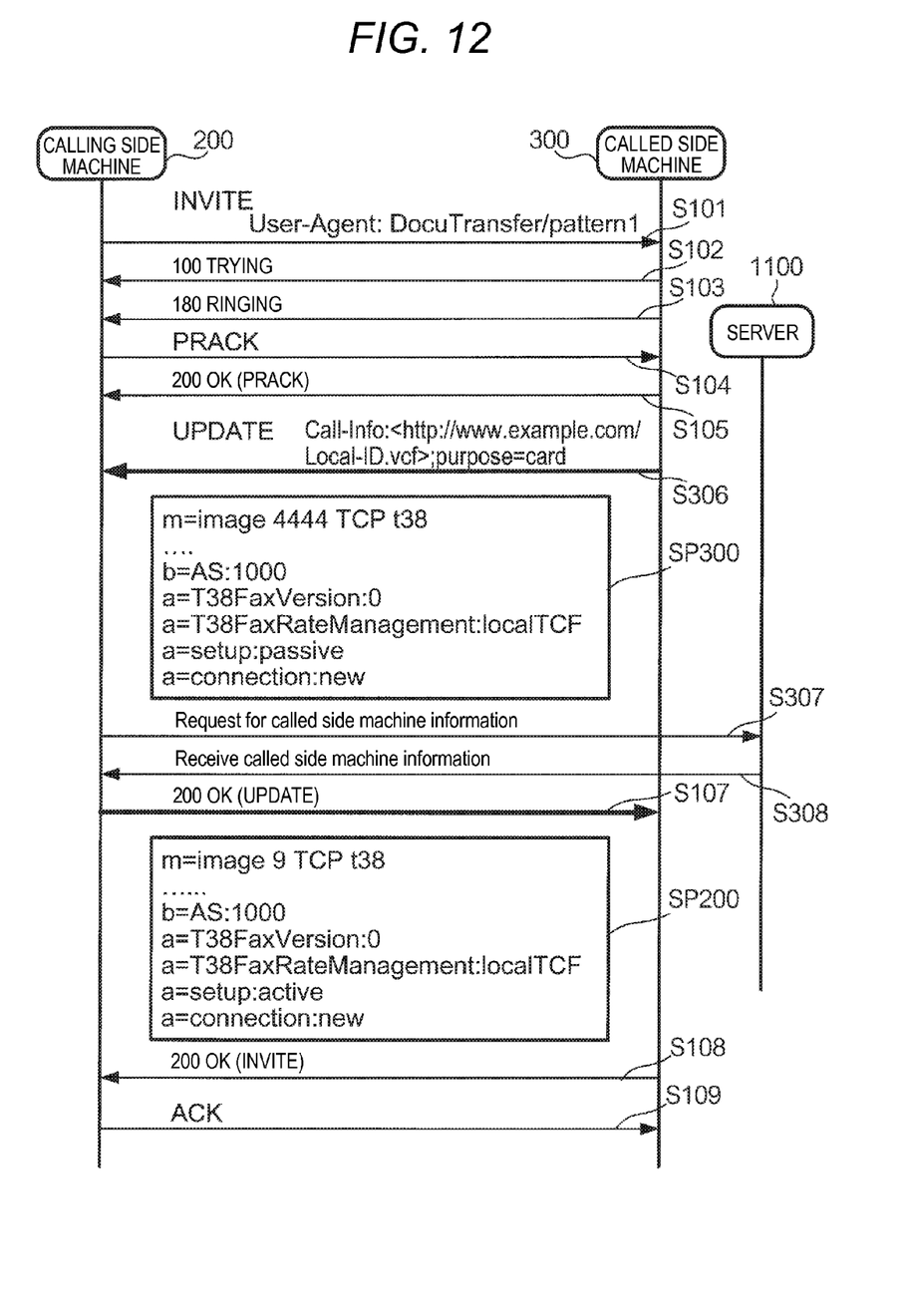
FIG. 12 is a view illustrating a sequence of a first modified embodiment.

FIG. 12 is a view illustrating a sequence of a first modified embodiment.

Steps S101 to S105 have the same configuration as those in the first exemplary embodiment.

At Step S306, the called side machine 300 transmits a memory address of the called side machine information to the calling side machine 200. The called side machine information is stored in a server 1100. The called side machine 300 transits the UPDATE message (offer) with a Call-Info header describing the memory address of the called side machine information.

At Step S307, the calling side machine 200 specifies an address described in the received UPDATE message and requests the server 1100 to send the called side machine information.

At Step S308, the called side machine 300 transmits the called side machine information at the request from the calling side machine 200. The calling side machine 200 presents the received called side machine information.

Steps subsequent to Step S107 have the same configuration as those in the first exemplary embodiment.

Modified Embodiment 2

The called side machine 300 may transmit the called side machine information using a potential response.

Figure 13:
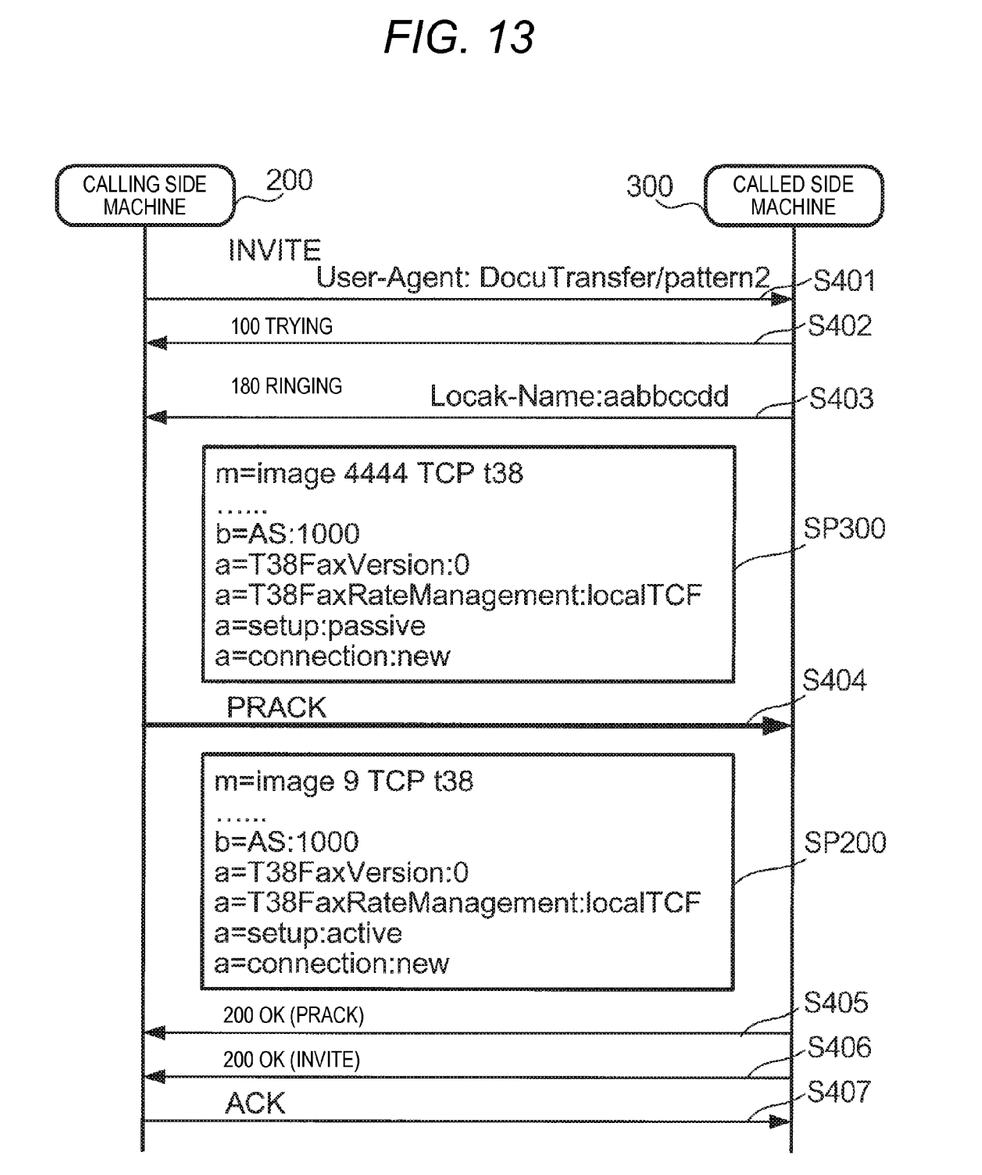
FIG. 13 is a view illustrating a sequence of a second modified embodiment.

FIG. 13 is a view illustrating a sequence of a second modified embodiment.

At Step S401, the calling side machine 200 transmits the INVITE message including pattern information to the called side machine 300 according to the function as the first transmitting unit 101. OAP is Pattern2. That is, the OAP of this modified embodiment is different from that of the first exemplary embodiment and an offer is transmitted using a potential response.

At Step S402, the called side machine 300 transmits the 100 Trying message (in trial) to the calling side machine 200.

At Step S403, the called side machine 300 transmits the 180 Ringing message (in call) serving as the potential response, along with the called side machine information and the session parameter of the called side machine 300 added to the 180 Ringing message, to the calling side machine 200. That is, this 180 Ringing message is an offer for the calling side machine 200.

In addition, since an addition of the Organization header to the potential response is not identified in SIP, this modified embodiment uses a Local-Name header as a new header to add an organization name to the potential response.

At Step S404, the calling side machine 200 transmits the PRACK message (ACK for the potential response), along with the session parameter of the calling side machine 200 added to this message, to the called side machine 300. That is, this PRACK message is an answer to the called side machine 300.

At Step S405, the called side machine 300 transmits the 200 OK message (a successful response to PRACK) to the called side machine 300.

At Step S406, the called side machine 300 transmits the 200 OK message (a successful response to INVITE) to the calling side machine 200.

At Step S407, the calling side machine 200 transmits ACK to the called side machine 300. This allows a session between the calling side machine 200 and the called side machine 300 to be established and allows image data to be transmitted from the calling side machine 200 to the called side machine 300. (The rest is omitted)

Modified Embodiment 3

For the calling side machine 200, an association of the called side machine information with allowance/disallowance information indicating allowance/disallowance of session establishment with the called side machine 300 may be registered in the address book and the answer may not be transmitted to the called side machine 300 if the disallowance information corresponding to the received called side machine information indicates the disallowance of the session establishment.

Figure 14:
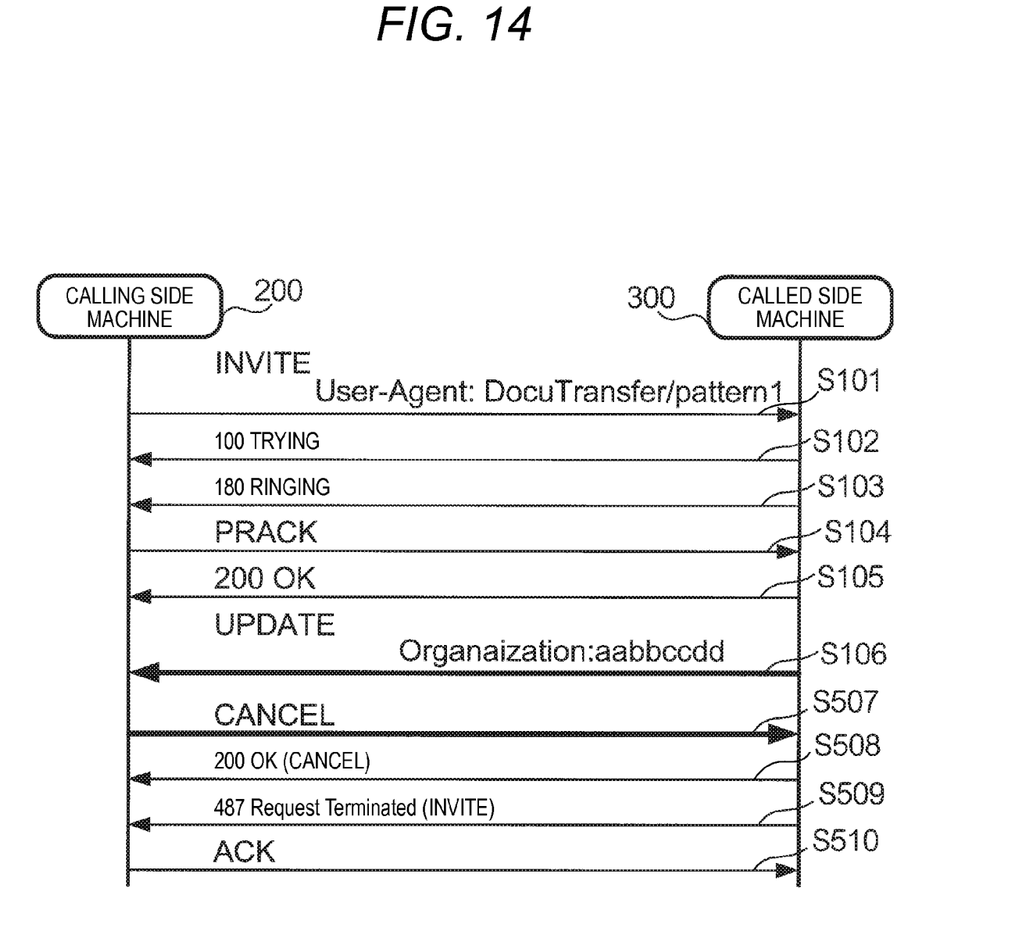
FIG. 14 is a view illustrating a sequence of a third modified embodiment.

FIG. 14 is a view illustrating a sequence of a third modified embodiment.

Steps S101 to S106 have the same configuration as those in the first exemplary embodiment.

At Step S507, the calling side machine 200 determines whether or not the disallowance information corresponding to the received called side machine information indicates the allowance of the session establishment, and, if this information indicates disallowance, transmits a CANCEL message to the called side machine 300.

At Step S508, the called side machine 300 transmits the 200 OK message (a successful response to CANCEL) to the calling side machine 200.

At Step S509, the called side machine 300 transmits a 487 Request Terminated message (ending of a process corresponding to INVITE) to the calling side machine 200.

At Step S510, the calling side machine 200 transmits ACK to the called side machine 300. The session establishment is stopped by the above process.

Otherwise, if it is determined that the disallowance information corresponding to the received called side machine information indicates the allowance of the session establishment, the calling side machine 200 may receive the called side machine information, followed by transmitting an answer to the called side machine 300, without presenting the called side machine information.

In addition, the calling side machine 200 may transmit an offer to the called side machine 300 corresponding to the disallowance information indicating the allowance of the session establishment, without transmitting pattern information.

Modified Embodiment 4

For the calling side machine 200, an offer may be transmitted along with pattern information.

Figure 15:
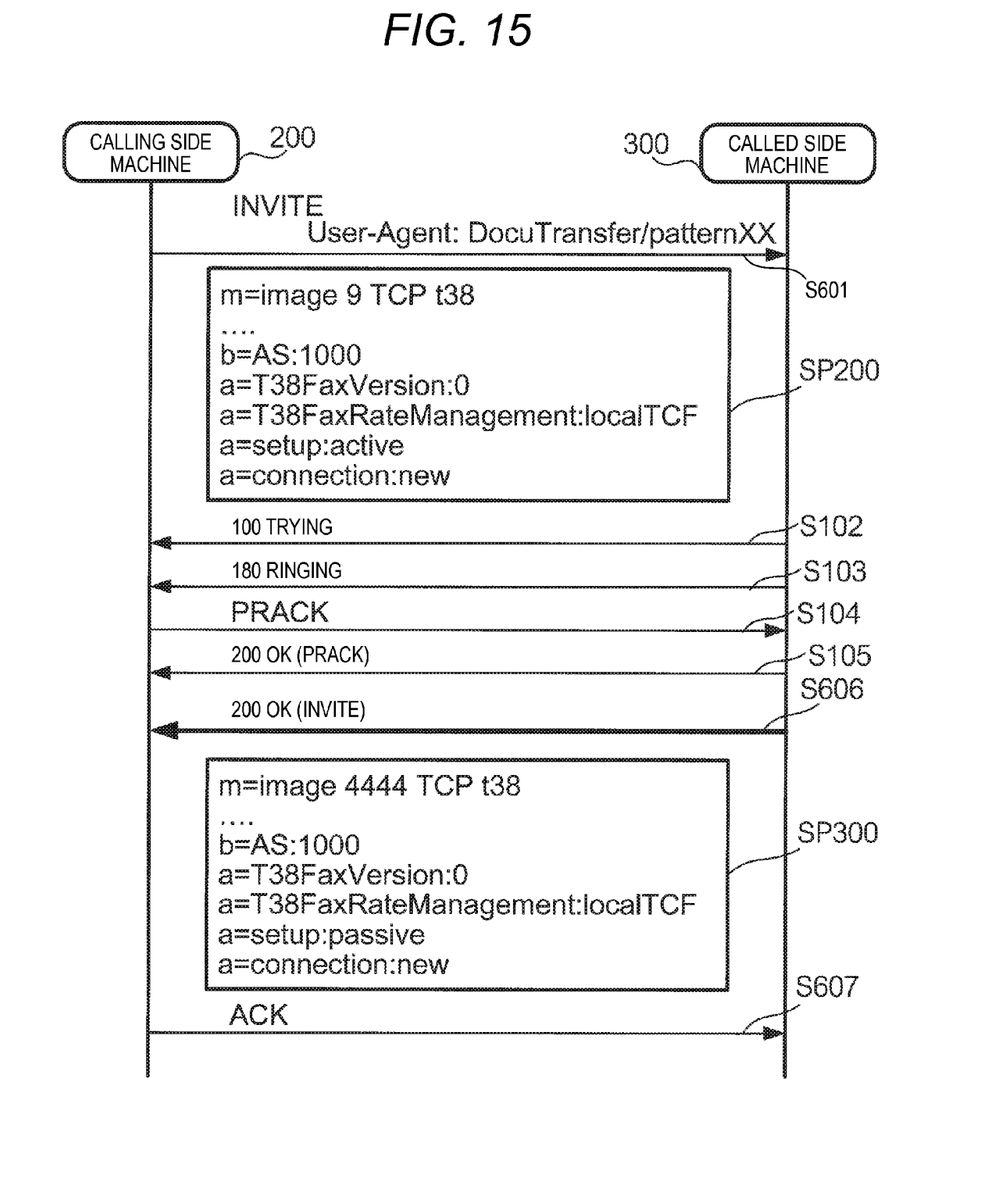
FIG. 15 is a view illustrating a sequence of a fourth modified embodiment.

FIG. 15 is a view illustrating a sequence of a fourth modified embodiment.

At Step S601, the calling side machine 200 transmits the INVITE message (offer) including the pattern information and the session parameter of the calling side machine 200 to the called side machine 300.

Steps S102 to S105 have the same configuration as those in the first exemplary embodiment.

At Step S606, the called side machine 300 transmits the 200 OK message (answer) including the session parameter of the called side machine 300 to the calling side machine 200.

At Step S607, the calling side machine 200 transmits ACK to the called side machine 300. The above process allows a session to be established even if the called side machine 300 cannot interpret the pattern information or OAP corresponding to the pattern information is not described in the communication control program of the called side machine 300.

Modified Embodiment 5

While it has been illustrated in the above exemplary embodiments that the facsimile machine 100 has the facsimile function based on ITU-T T.38, it may have a facsimile function based on ITU-T T.37 or the like.

In addition, while exemplary applications of the present invention to the facsimile machine have been illustrated in the above exemplary embodiments, the present invention may be applied to any communication apparatuses having the functional function illustrated in FIG. 10.

In addition, the above-described communication control program may be recorded in a computer-readable recording medium such as an optical recording medium, a semiconductor memory or the like and may be stored in the storing unit 5 by reading the program from the recording medium. In addition, this program may be provided via an electrical communication link. In addition, the same function may be implemented by hardware.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication device comprising:
   a first transmitting unit that transmits, to a called side machine, pattern information specifying a pattern in which session parameters of a calling side machine and the called side machine are exchanged by offer and answer, the pattern information corresponding to a pattern used to transmit the offer from the called side machine, the offer including the session parameter of the called side machine;
   a presenting unit that presents called side machine information when the offer transmitted from the called side machine according to the pattern specified in the pattern information and the called side machine information that identifies the called side machine are received; and
   a second transmitting unit that establishes a session with the called side machine by transmitting the answer to the called side machine when a predefined condition is satisfied after the presenting unit presents the called side machine information, the answer including the session parameter of the calling side machine.

2. The communication device of claim 1, further comprising:
   a receiving unit that receives an operation,
   wherein the second transmitting unit transmits the answer to the called side machine when a predefined operation is received by the receiving unit after the presenting unit presents the called side machine information.

3. The communication device of claim 1, further comprising:
   a clocking unit that counts an elapsed time after the presenting unit presents the called side machine information,
   wherein the second transmitting unit transmits the answer to the called side machine when the elapsed time reaches a threshold value.

4. The communication device of claim 1,
   wherein the first transmitting unit transmits calling side machine information that identifies the calling side machine, in addition to the pattern information.

5. The communication device of claim 1, further comprising:
   a registration unit registers the called side machine information,
   wherein the first transmitting unit transmits the offer to the called side machine corresponding to the called side machine information registered in the registration unit, without transmitting the pattern information.

6. The communication device of claim 1, further comprising:
   a registration unit registers the called side machine information,
   wherein, when the received called side machine information has been registered in the registration unit, the presenting unit does not present the called side machine information and the second transmitting unit receives the called side machine information, followed by transmitting the answer to the called side machine.

7. A communication device comprising:
   a transmitting unit that transmits, to a calling side machine, an offer including one of called side machine information that identifies a called side machine or a memory address of the called side machine information,
   wherein the transmitting unit transmits the offer according to pattern information received from the calling side machine, the pattern information corresponding to a pattern for transmitting the offer using Session Initiation Protocol (SIP).

8. The communication device of claim 7,
   wherein, in response to (i) the transmitting unit receiving the pattern information via an external channel and (ii) the received pattern information not including calling side machine information that identifies the calling side machine, the transmitting unit omits the called side machine information and the memory address from the offer transmitted to the calling side machine.

9. The communication device of claim 7,
wherein, in response to the transmitting unit receiving the pattern information via an internal line and (ii) either the received pattern information including calling side machine information that identifies the calling side machine or the received pattern information not including the calling side machine information that identifies the calling side machine, the transmitting unit includes the called side machine information or the memory address in the offer transmitted to the calling side machine.

10. A facsimile machine comprising:
a communication device of claim 1;
a reading unit that generates image data by optically reading a manuscript; and
an image data transmitting unit transmits the image data to the called side machine when a session with the called side machine is established.

11. A facsimile machine comprising:
a communication device of claim 7; and
an image forming unit that forms an image on a recording medium based on image data received from the calling side machine when a session with the calling side machine is established.

12. A non-transitory computer readable medium storing a program causing a computer to execute a process for a communication, the process comprising:
transmitting, to a called side machine, pattern information specifying a pattern in which session parameters of a calling side machine and the called side machine are exchanged by offer and answer, the pattern information corresponding to a pattern used to transmit the offer from the called side machine, the offer including the session parameter of the called side machine;
presenting called side machine information when the offer transmitted from the called side machine according to the pattern specified in the pattern information and the called side machine information that identifies the called side machine are received; and
establishing a session with the called side machine by transmitting the answer to the called side machine when a predefined condition is satisfied after the presenting the called side machine information, the answer including the session parameter of the calling side machine.

13. A non-transitory computer readable medium storing a program causing a computer to execute a process for a communication, the process comprising:
transmitting, to a calling side machine, an offer including one of called side machine information that identifies a called side machine or a memory address of the called side machine information,
wherein the offer is transmitted according to pattern information received from the calling side machine, the pattern information corresponding to a pattern for transmitting the offer using Session Initiation Protocol (SIP).

14. A communication device comprising:
a first transmitting unit that transmits to a called side machine, a request for establishing a session with the called side machine;
a presenting unit that presents called side machine information in response to receiving from the called side machine, the called side machine information to identify the called side machine; and
a second transmitting unit that transmits to the called side machine, a confirmation of the session establishment with the called side machine in response to a predefined condition being satisfied after the presenting unit presents the called side machine information.

* * * * *